United States Patent [19]

Shiseki et al.

[11] 4,438,358
[45] Mar. 20, 1984

[54] MEANS FOR SUPPRESSING VIBRATION AND NOISE IN A DEVICE DRIVEN BY A SMALL ELECTRIC MOTOR

[75] Inventors: Yutaka Shiseki; Junichi Yagi, both of Kanagawa; Yasuyuki Miura, Tokyo, all of Japan

[73] Assignee: Ozen Co., Ltd., Tokyo, Japan

[21] Appl. No.: 927,755

[22] Filed: Jul. 25, 1978

[30] Foreign Application Priority Data

Nov. 21, 1977 [JP] Japan .................. 52-139605

[51] Int. Cl.$^3$ ............................................. H02K 5/24
[52] U.S. Cl. ....................................... 310/51; 310/90
[58] Field of Search ............... 310/1, 40 MM, 51, 90, 310/154, 166, 173, 75 R; 308/37

[56] References Cited

U.S. PATENT DOCUMENTS

| | | | |
|---|---|---|---|
| 2,939,024 | 5/1960 | Mabuchi | 310/40 MM |
| 3,114,060 | 12/1963 | Goettl | 310/51 |
| 3,135,887 | 6/1964 | Schaffan | 310/1 |
| 3,343,016 | 9/1967 | Lewis | 310/51 |
| 3,361,914 | 1/1968 | Janssen | 310/90 UX |
| 3,394,908 | 7/1968 | Irvin | 310/51 UX |
| 3,483,407 | 12/1969 | Frohmüller | 310/51 |
| 3,546,504 | 12/1970 | Janssen | 310/51 |
| 3,666,057 | 5/1972 | Leifer | 310/51 |
| 4,074,159 | 2/1978 | Robinson | 310/40 MM |

FOREIGN PATENT DOCUMENTS

| | | | |
|---|---|---|---|
| 1613343 | 1/1971 | Fed. Rep. of Germany | 310/51 |
| 2453163 | 5/1976 | Fed. Rep. of Germany | 310/51 |
| 559946 | 3/1944 | United Kingdom | 310/51 |
| 764609 | 12/1956 | United Kingdom | 310/51 |
| 1440660 | 7/1976 | United Kingdom | 310/51 |

Primary Examiner—R. Skudy
Attorney, Agent, or Firm—Irving M. Weiner; Pamela S. Burt; John L. Shortley

[57] ABSTRACT

In a device driven by a small size electric motor incorporated in the device, a rotating shaft, namely, an output shaft of the electric motor is biased by a force in a direction diametrically crosswise to a line connecting N-pole and S-pole of the field magnet of the motor.

Aperture of the bearing for receiving the output shaft of the motor in its cross section normal to the output shaft is preferred to have a profile composed of a semicircle at its half part opposite to the direction of biasing and the other half of the aperture at the same side of the direction of the biasing is formed into a triangle so as to have tapered two planes for receiving the output shaft.

By virtue of this aperture configuration, output shaft of the motor is forcibly against the tapered surfaces so as to be kept stable free from any undesirable vibration and noise.

19 Claims, 23 Drawing Figures

MEANS FOR SUPPRESSING VIBRATION AND NOISE IN A DEVICE DRIVEN BY A SMALL ELECTRIC MOTOR

BACKGROUND OF THE INVENTION

1. Field of the Invention

This invention relates to a means for suppressing vibration and noise generated in a device driven by a small electric motor, and more particularly to a means for suppressing vibrations of a rotating shaft of a motor incorporated in the device. Vibration and noise are suppressed by drawing the shaft of the motor, by means of its power transmitting device, in a direction diametrically transverse to a line connecting the S-N poles of the field magnet of the motor, thereby suppressing vibration generated in the same direction.

2. Prior Art

Devices driven by a small electric motor include sound reproducing and non sound-reproducing toys. Most of the devices are constructed to drive their moving parts by a force imparted by the output shaft of the motor incorporated in the device.

It has been found that among devices driven by a small electric motor, some sustained excessive vibration at the drive source, while others sustained by almost no vibration.

It has also been found that some devices generated noise due to vibration of the output shaft but that others did not generate any appreciable amount of noise, and that the generated vibration and noise varied from being serious to almost neglible. Many difficulties have been encountered by toy manufacturers in overcoming these problems.

Above all, most sound reproducing toys generate noise in their sound reproduction mechanism, which results in a degradation of the tonal quality of the toy.

OBJECT OF THE INVENTION

This invention eliminates the above-mentioned drawbacks of devices driven by a conventional small electric motor. Therefore, an object of the invention is to suppress the generation of vibration and noise through use of a device of very simplified construction.

Another object of the present invention is to provide a means for suppressing vibration and noise sustained by the numerous devices using small electric motors.

A further object of the present invention is to provide a means for suppressing vibration and noise in a device of simplified construction, such as the sound reproducing mechanism of a toy.

SUMMARY OF THE INVENTION

To accomplish the above-mentioned objects, the present invention uses a small electric motor wherein the output shaft of the motor is drawn in a direction diametrically transverse to a line connecting the S-pole and N-pole of the field magnet of the motor.

Devices into which a small electric motor of the present invention is most suitably incorporated are sound reproducing devices in dolls or toys.

A small electric motor of the present invention is incorporated in a device either by placing a transmission belt around its output shaft or by engaging the output shaft directly to the rotating body to be driven.

In such an instance, it is highly desirable that the aperature of the bearing which receives the output shaft is formed close to the portion of the shaft drawn by the belt or the rotating body to create a profile which becomes narrower toward a diametrically transverse to a line connecting the S-N poles of the field magnet. The output shaft is received at both the ends by the tapered surfaces of bearings so that the output shaft is prevented from vibrating in a direction diametrically transverse to the S-N line and is stabilized by a self-centering action.

This invention originates from the inventors' discovery that the output shaft of a motor vibrates mainly in a direction diametrically transverse to a line connecting the S-pole and the N-pole of the field magnet.

Thus, most of the vibration and noise of the device can be suppressed if the device is assembled so that the output shaft of the motor is drawn by a transmission belt or rotating body in a direction dimetrically transverse to a line connecting S-pole and N-pole of the field magnet.

Furthermore, the aforesaid vibration and noise are almost entirely eliminated by receiving the output shaft in bearings having two planar surfaces that receive the output shaft at two points concurrently.

The present invention, suppresses vibration and noise generated by the rotation of a motor by a very simple means, thus, any device incorporating a small electric motor can be relieved of vibration and noise and thereby perform in a superior manner.

DETAILED DESCRIPTION OF THE PREFERRED EMBODIMENT

The inventors discovered that the vibration and noise generated in devices driven by a small electric motor are attributable to the vibration of the output shaft of the motor.

Efforts have generally been made to eliminate vibrations of the output shaft of the motor by improving the accuracy of motor bearings without studying the effect of the direction in which the output shaft of the motor is drawn by the transmitting belt or body to be driven. Many difficulties arose in making a small motor having bearings of high grade, due partly to a size restrictions of a small motor, and partly to cost restrictions imposed because of the fact that most of the devices driven by small electric motors are toys.

In view of these facts, the inventors conducted a series of experiments using a great number of similar toys. It was found that the direction in which the output shaft of the motor was drawn by the transmitting belt or body to be driven seriously affected the type and magnitude of the vibration.

In other words, it was confirmed that the type and magnitude of the vibration varies depending upon the direction of the force exerted by the transmission belt on the output shaft, or on the proximity of the rotating body that is driven directly by the output shaft of the motor to the aperture of the motor that receives the output shaft.

Thus, the inventors of the present invention conducted a series of experiments assuming that there might exist some significant relation between the direction of the magnetic force exerted by the field magnet of the motor and the force applied by the transmission belt or rotating body.

Embodiments of the present invention were developed through these experiments, which were conducted using sound reproducing toys, more particularly, toy record players.

Figure 1:
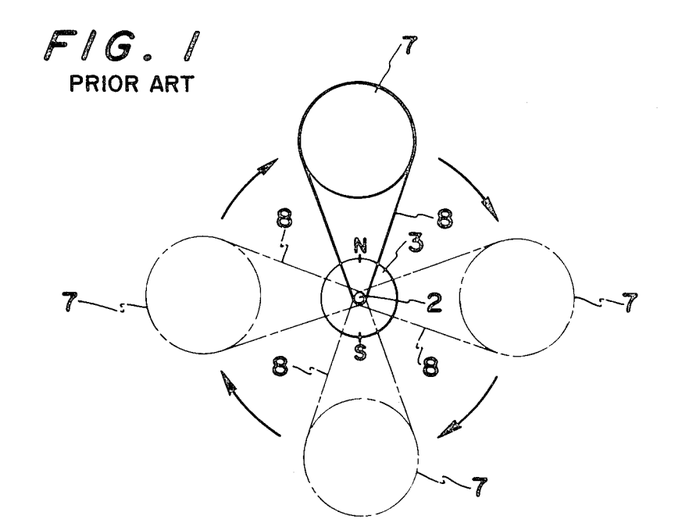
FIG. 1 is a drawing showing how the experiments were conducted to investigate the relation between the vibration of a motor and the direction the output shaft of the test motor was drawn.

As shown in FIG. 1, which illustrates how the experiments were conducted, each motor 3 is placed with its N-pole and S-pole at a fixed location, and a transmission belt 8 is extended around the output shaft 2 and the turn table 7 of a record player, the output shaft 2 is thereby drawn towards the center of the turn table 7. FIG. 1 illustrates the use of a known prior art device for test purposes.

The turn table 7 was rotated by the motor and further revolved 10° around the motor after each test the sector had been finished, and the extent of the noise corresponding to the magnitude of the vibration of the output shaft 2 per each sector of the circle was observed. It was proved that the extent of vibration and noise varied depending upon the direction of the force drawing the output shaft 2.

A large number of experiments were conducted in the same way using numerous motors of the same kind, as a result, a different magnitude of vibration and noise was observed in most of the motors.

FIGS. 2A through 2J are graphs representing the magnitude of the vibration and noise generated by each of 10 motors when each output shaft 2 was drawn from different directions.

Figure 2:
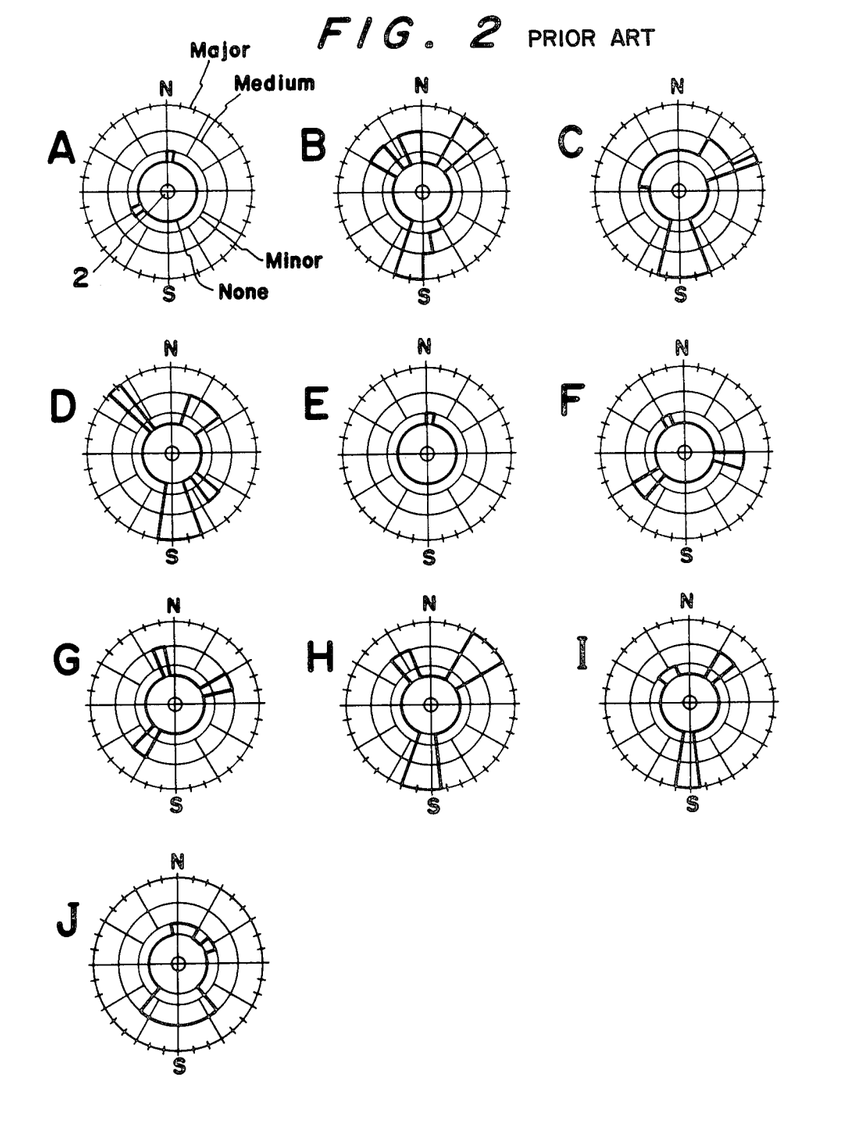
FIGS. 2A through 2J show a series of polargraphs depicting the results of experiments conducted in accordance with the manner illustrated in FIG. 1 upon a number of motors.

The magnitude of the noise and vibration is shown in the polargraphs of FIG. 2 by a thick line and is classified into three zones major, medium and minor. These zones of vibration are indicated by five concentric circles of which the outermost circle represents major noise, the second circle from the outermost represents medium noise, the third circle represents minor noise, and the fourth circle indicates no noise. The innermost small circle indicates the output shaft.

Radial length of the outermost circle and the second outer circle, the second outer circle and the third outer circle, and the third outer circle and the innermost circle are shown in proportions of 3:2:1, respectively.

Graduations placed on the outermost circle of each graph show units of 10 degrees.

Each graph in FIG. 2 shows the magnitude of vibration observed with each motor, for instance, FIG. 2A shows that only minor vibration was generated in the output shaft 2 when it was drawn in the directions shown by the sectors of 0°-10° and 240° designated clockwise starting from the N-pole.

Similarly, FIG. 2H shows that major vibration is generated when the output shaft 2 is urged in directions of 30°-60° and 175°-200°, and medium vibration was generated in a sector of 320°-340°.

Among the graphs of FIG. 2, FIG. 2A and FIG. 2E show that the motors generated only minor vibration in a limited range of directions. The limited directions are presumed to be those in which a tight clearance between the bearing and the output shaft of the motor in the direction of the drawing force reduced the effect of the drawing force.

The inventors conducted further experiments in the same manner as shown in FIG. 1 and FIGS. 2A through 2J using 106 motors in one experiment and 100 motors in a second experiment. The results were consolidated into two polar graphs, FIG. 3 and FIG. 4, respectively.

Figure 3:
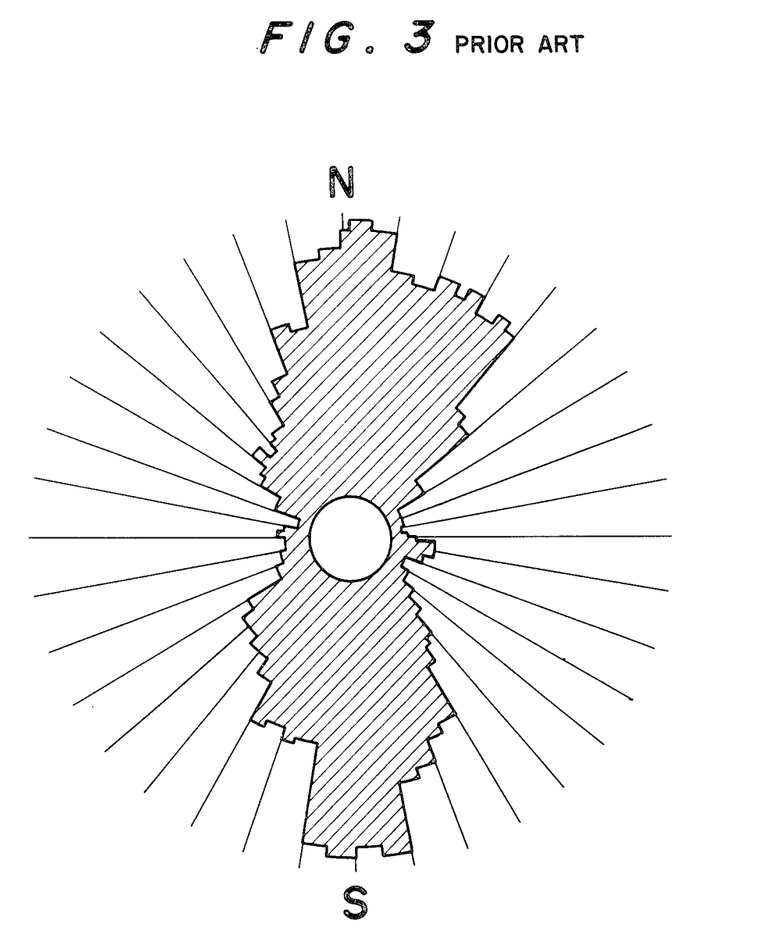
FIG. 3 and FIG. 4 are polargraphs consolidating the results of the experiments comparing the magnitude of the vibration and the force applied.
Figure 4:
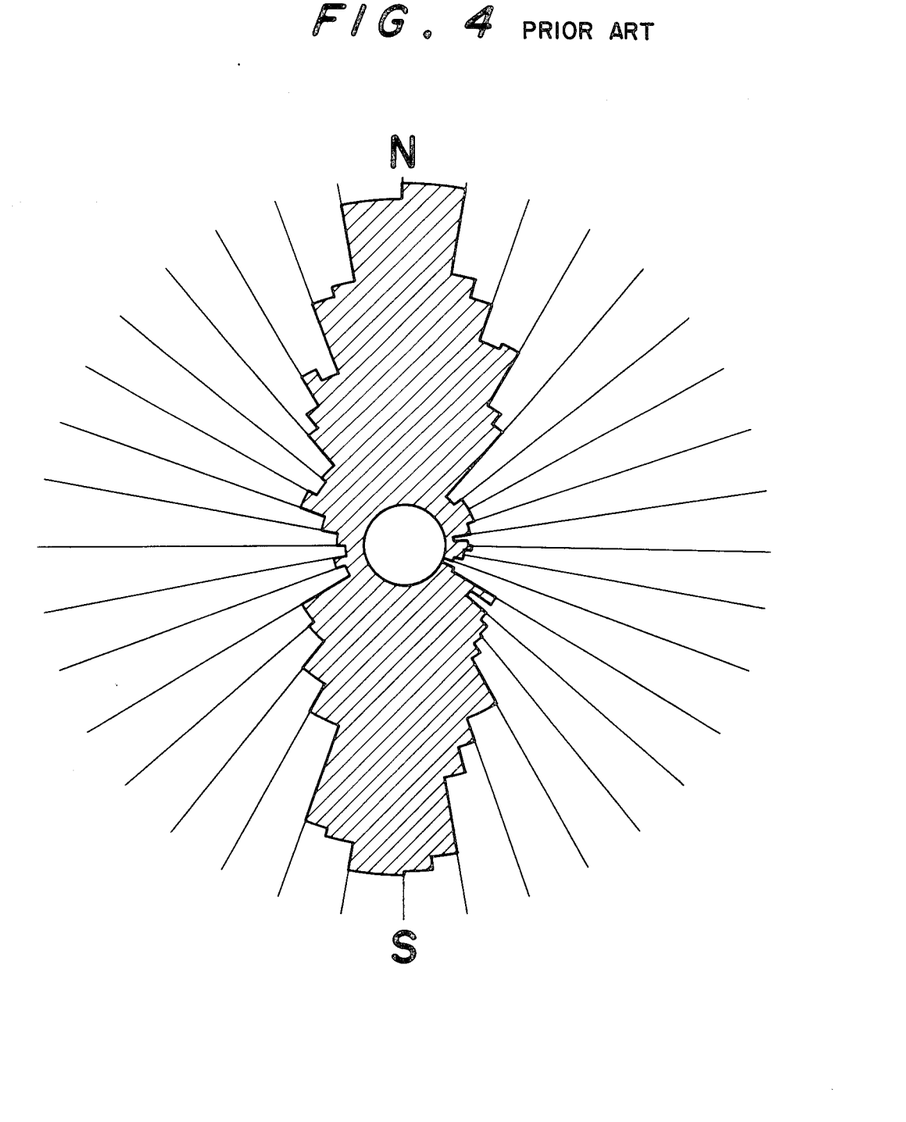
Figure 5:
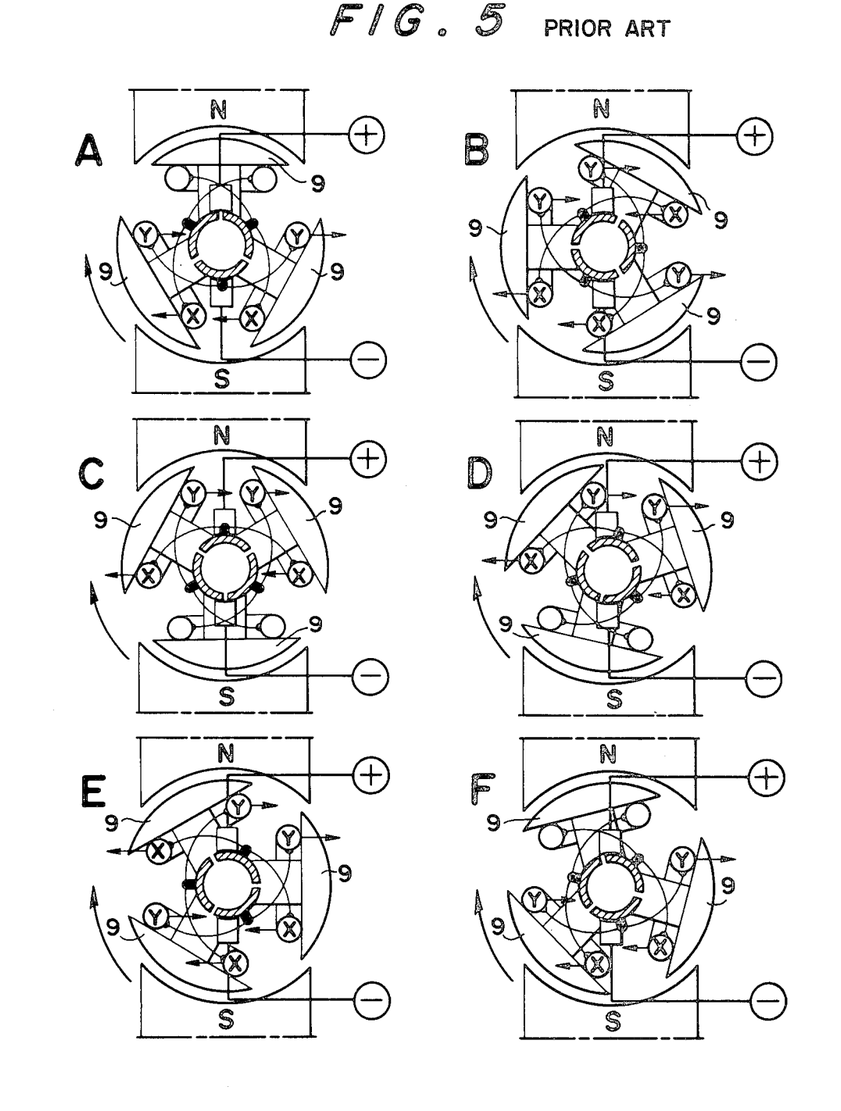
FIGS. 5A–5F show the direction of forces generated between an armature and a fixed field for selected rotational positions of the armature.

It can be seen from FIGS. 3 and 4 that the greatest amount of vibration was generated when the load or draft on the output shaft 2 was drawn in a direction connecting the N-pole and S-pole of the motor, while the amount of vibration generated was the least when the load or draft on the output shaft was drawn in a direction diametrically transverse to a line connecting the N-pole and S-pole.

The present invention was developed from the above-mentioned test results. The output shaft of a small electric motor to be incorporated in sound reproducing toys or the like is drawn in a direction diametrically transverse to a line connecting the N-pole and S-pole of the field magnet so as to prevent vibration of the output shaft, thereby suppressing the vibration and noise generated in the device.

The phenomenon, that vibration of an output shaft is generated in a direction diametrically transverse to a line connecting the N-pole and S-pole, can be explained by considering the direction of forces generated in an armature of a motor.

As can be clearly seen in FIGS. 5A through 5F, conductive bodies (X) and (Y) of the armature 9 in a uniform magnetic field are energized, in accordance with Fleming's left hand law, in a direction diametrically transverse to a line connecting the N-pole and S-pole of the motor as indicated by the horizontal arrows in the drawing. The conductive bodies generate vibration in the same direction. FIGS. 5A through 5F illustrate a prior art motor.

This vibration can be suppressed by biasing the output shaft 2 in a direction diametrically transverse to a line connecting the N-pole and the S-pole, and restraining the remaining vibration by any suitable means.

It is preferable that the drawing force be applied in a direction diametrically transverse to a line connecting N-pole and S-pole, however, considerable vibration can be suppressed if the direction of the drawing force is transverse to the shaft at an angle of 30° to 90° to a line connecting the N-pole and S-pole.

Various methods of drawing the output shaft can be used. For example, in the embodiment shown in FIGS. 6 and 7, a transmission belt 8 is extended around the output shaft 2 for drawing the shaft in a direction, shown by arrow K normal to the line connecting the N-pole and S-pole of the field magnet 1.

Figure 6:
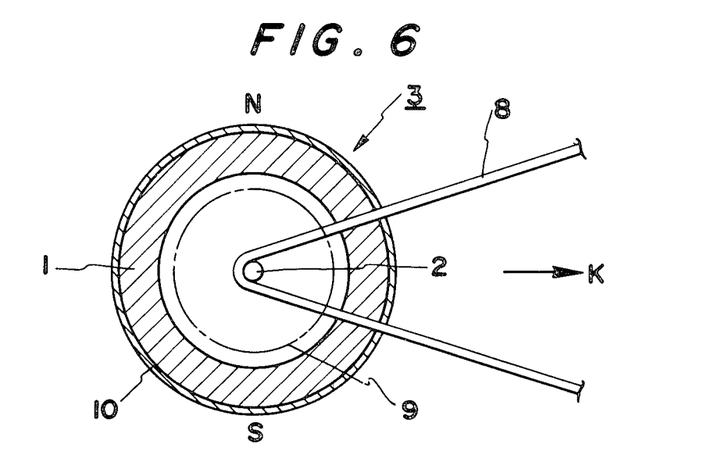
FIG. 6 is a cross sectional plan view of the small electric motor of the present invention.
Figure 7:
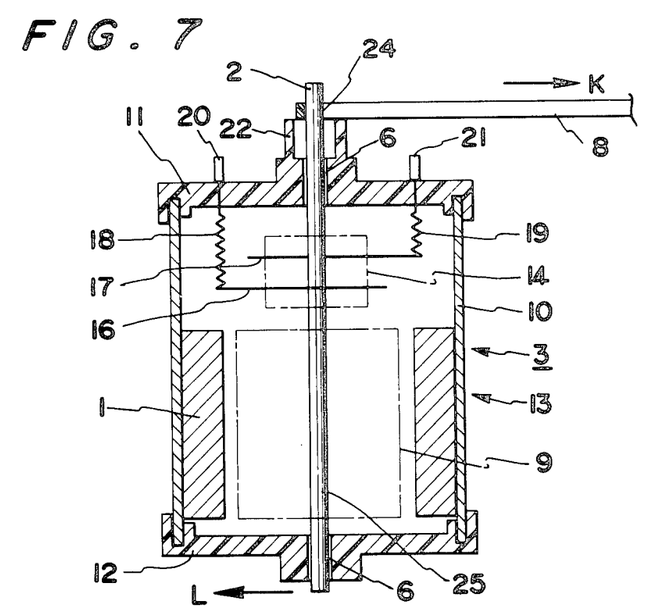
FIG. 7 is a cross sectional elevational view of the motor shown in FIG. 6.

In the small electric motor 3 of this invention, the yoke 10, front body portion of bracket 11, and rear body portion of bracket 12, which are mounted to cover both the axial end opening of the yoke 10 and field magnet 1 received in an internal space of the yoke 10, constitute a stator 13. The output shaft 2 is passed through the center of the body portion or front bracket 11 and the rear body portion or bracket 12, and a commutator 14 and an armature 9 are fixed about the output shaft 2.

Brushes 16 and 17 are connected, respectively, to terminals 20 and 21 via brush springs 18 and 19.

The electric motor 3 itself is well-known, so further detailed explanation thereof is omitted.

In the motor 3, as clearly shown in FIG. 7, a spacer 22 is provided integral with the front bracket 11 to provide a suitable distance between the bearing 6 in the front body portion or bracket 11, the output shaft 2, and the front portion 24 of the shaft 2 which receives a transmission belt 8. The front end 24 of the shaft 2 passing through the bearing 6 is drawn in a direction shown by arrow K, while the rear 25 of the shaft 2 is urged in a direction shown by arrow L, opposite to the direction shown by arrow K, by a force opposite to the force imparted by the belt 8.

The directions shown by the arrows K and L, extend from the output shaft 2 diametrically transverse to the line connecting N-pole and S-pole of the field magnet 1.

The portion 24 of the output shaft 2 near the front bearing 6 is longer in length than the rear portion 25, and accordingly the force given to the shaft 2 in the L direction is less than the force in the direction K drawn by the belt 8.

If the amount of force applied in direction L is not sufficient to suppress vibration of the shaft, additional means may be provided to further urge the output shaft 2 in direction L, for instance, providing a spring mechanism (not shown) to the bearing 6 of the rear bracket 12.

This manner of urging by means of a spring mechanism may be used as an alternative to the drawing of the transmission belt 8.

Instead of the above-mentioned urging by means of a transmission belt and/or a spring or springs, a rim for transmitting rotational force of the output shaft 2 to the part to be driven can be used for drawing the output shaft 2 by its rotational contact.

Figure 8:
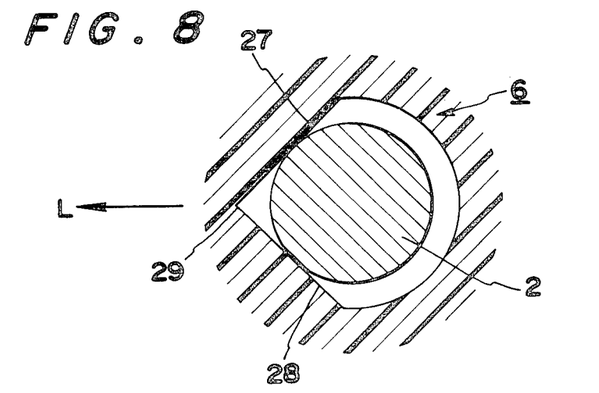
FIG. 8 is a cross sectional view showing an embodiment of the output shaft receiving bearing used in the motor of the present invention.

FIG. 8 is a sectional view of another embodiment of the bearing for receiving the output shaft 2 in which two planes 27 and 28 which intersect at a point 29 to form bearing surfaces. The output shaft 2 is urged by the aforesaid means in a direction towards the point 29.

In this embodiment the output shaft 2 is urged against the interior surface of the two planes 27 and 28 within a range defined by the two planes, and vibration of the output shaft 2 is thereby completely eliminated.

The aperture for retaining the bearing 6 is not required to be limited to the shape as shown in FIG. 8, but may be of any other suitable profile, provided that it has said two planes 27 and 28 and also permits the output shaft 2 to pass through the aperture, consequently, the profile of the two planes 27 and 28 is not necessarily straight and crossed at only a point such as 29, but may be connected by a curved plane contiguous to both planes.

The above-mentioned bearing is especially preferable for a bearing provided in the rear bracket 12, as used in motor assembly shown by FIG. 6 and FIG. 7.

As the amount of biasing force exerted on the output shaft at the bearing 6 in the rear body portion or bracket 12 is lower than that exerted at the bearing 6 in the front body portion or bracket 11, the output shaft may move along the inner surface of the aperture of the bearing 6 in the rear body portion bracket 12, in other words, precession is caused in the aperture by the belt 8.

Such kind of tumbling movement or precession gives rise to vibration of the output shaft 2, but this vibration can be suppressed by applying restraining force provided by the two tapered planes 27 and 28.

The smaller the angle formed by the two planes 27 and 28, the greater the restraining force provided by the two planes 27 and 28.

A bearing having an aperture profile similar to this may also be used as a bearing for the body portion of front bracket 11.

As explained in the foregoing paragraphs, the problem of vibration of the output shaft in devices driven by a small electric motor can be eliminated by selecting and fixing the location and relative direction of the motor in connection with the direction of the drawing force applied to the output shaft by a transmission belt or the like.

Consequently, not only the vibration and noise of the device itself, but also the noise in the reproduced sound can be eliminated. Thus, the entire device can be operated more quietly, and with a far longer service life.

Also, this invention further reduces noise by stabilizing the axis of the output shaft of the driving motor by providing the inner surface of the bearing with two planes for receiving the output shaft.

What is claimed is:

1. An electric motor comprising:
   an output shaft;
   said motor being provided with a field magnet having a north pole and a south pole which are diametrically opposed;
   said shaft supporting an armature and extending transversely through the field provided by said poles;
   means urging said shaft in a direction diametrically transverse to a line connecting said north and south poles of said field magnet whereby vibration of said shaft is suppressed;
   the angle between the direction of said means urging said shaft and said line connecting said north pole and said south pole lies in the range of from 30° to 90°; and
   the direction of the said means urging the output shaft is normal to said line connecting said north and south poles.

2. The motor according to claim 1, wherein:
   the output shaft of said motor is biased by a transmission belt.

3. An electric motor comprising:
   a field magnet having a north pole and a south pole which are diametrically opposed;
   an output shaft supporting an armature and extending transversely through the field produced by said poles;
   means urging said shaft in a direction diametrically transverse to a line connecting said north and south poles;
   a bearing for said shaft adjacent at least one end of said output shaft;
   said bearing including an aperture having a profile which includes planes for respectively contacting the peripheral surface of said output shaft at two positions spaced by an angle less than 180°;
   the angle between the direction of said means urging said shaft and said line connecting said north pole and said south pole lies in the range of from 30° to 90°; and the direction of the said means urging the output shaft is normal to said line connecting said north and south poles.

4. A motor according to claim 3, wherein:
said bearing is provided with a profile which includes planes for contacting said shaft, which planes merge toward each other in a direction substantially opposite to the direction in which said output shaft is urged.

5. A motor according to claim 3, wherein:
said planes intersect along a line positioned to intersect a line normal to the axis of the shaft and extending in the direction of the force biasing said shaft.

6. The motor according to claim 3, wherein:
the output shaft of said motor is biased by a transmission belt.

7. The motor according to claim 4, wherein:
the output shaft of said motor is biased by a transmission belt.

8. The motor according to claim 5, wherein:
the output shaft of said motor is biased by a transmission belt.

9. The motor according to claim 3, wherein:
the output shaft of the motor is biased by a spring means.

10. The motor according to claim 4, wherein:
the output shaft of the motor is biased by a spring means.

11. The motor according to claim 5, wherein:
the output shaft of the motor is biased by a spring means.

12. An electric motor comprising:
a field magnet having a north pole and a south pole which are diametrically opposed;
an output shaft supporting an armature and extending transversely through the field produced by said poles;
means urging said shaft in a direction diametrically transverse to a line connecting said north and south poles;
a bearing for said shaft adjacent at least one end of said output shaft;
said bearing including an aperture having a profile which includes planes for respectively contracting the peripheral surface of said output shaft at two positions spaced by an angle less than 180°; and
the output shaft of the motor is biased by a spring means.

13. A motor according to claim 12, wherein:
said bearing is provided with a profile which includes planes for contacting said shaft, which planes merge toward each other in a direction substantially opposite to the direction in which said output shaft is urged.

14. A motor according to claim 12, wherein:
said planes intersect along a line positioned to intersect a line normal to the axis of the shaft and extending in the direction of the force biasing said shaft.

15. The motor according to claim 12, wherein:
the angle between the direction of said means urging said shaft and said line connecting said north pole and said south pole lies in the range of from 30° to 90°.

16. The motor according to claim 13, wherein:
the angle between the direction of said means urging said shaft and said line connecting said north pole and said south pole lies in the range of from 30° to 90°.

17. The motor according to claim 14, wherein:
the angle between the direction of said means urging said shaft and said line connecting said north pole and said south pole lies in the range of from 30° to 90°.

18. An electric motor comprising:
an output shaft;
said motor being provided with a field magnet having a north pole and a south pole which are diametrically opposed;
said shaft supporting an armature and extending transversely through the field provided by said poles;
means urging said shaft in a direction diametrically transverse to a line connecting said north and south poles of said field magnet whereby vibration of said shaft is suppressed;
the angle between the direction of said means urging said shaft and said line connecting said north pole and said south pole lies in the range of from 30° to 90°; and
the output shaft of the motor is biased by a spring means.

19. The motor of claim 18, wherein:
the direction of said means urging said output shaft is normal to said line connecting said north and south poles.

* * * * *